US006408775B2

(12) United States Patent
Hartwig

(10) Patent No.: US 6,408,775 B2
(45) Date of Patent: Jun. 25, 2002

(54) SEWING OR EMBROIDERY MACHINE

(75) Inventor: Jürgen Hartwig, Pforzheim (DE)

(73) Assignee: Viking Sewing Machines AB (SE)

( * ) Notice: Subject to any disclaimer, the term of this patent is extended or adjusted under 35 U.S.C. 154(b) by 0 days.

(21) Appl. No.: 09/815,322

(22) Filed: Mar. 22, 2001

(30) Foreign Application Priority Data

Mar. 23, 2000 (DE) ........................................ 100 14 534

(51) Int. Cl.[7] .......................... D05B 19/12; D05B 87/04
(52) U.S. Cl. ................... 112/470.04; 112/445; 345/473
(58) Field of Search ............................. 112/102.5, 445, 112/475.19, 470.01, 470.06; 345/473

(56) References Cited

U.S. PATENT DOCUMENTS 4,901,656 A * 2/1990 Yoshida .................. 112/445 X
6,032,595 A * 3/2000 Okuyama ................ 112/102.5

FOREIGN PATENT DOCUMENTS

DE 3833605 A1 * 4/1989
DE 3823562 C2 * 11/1996

* cited by examiner

*Primary Examiner*—Peter Nerbun
(74) *Attorney, Agent, or Firm*—McGlew and Tuttle, P.C.

(57) ABSTRACT

A sewing or embroidery machine with a microprocessor (10), which is connected to an entry device (6, 19–22) for entering commands to a display screen (5), and to at least one memory (9, 13). A rapid and understandable explanation of certain operating procedures of the machine is possible when needed. The corresponding procedure is displayed by a series of images to explain the operating procedures. Image data explaining the operation of the sewing or embroidery machine, which are read by the microprocessor (10) after entering a corresponding command and are transferred to the display screen (5), optionally after further processing, are stored for this purpose in the memory (9, 13) of the sewing or embroidery machine (1).

13 Claims, 2 Drawing Sheets

SEWING OR EMBROIDERY MACHINE

FIELD OF THE INVENTION

The present invention pertains to a sewing or embroidery machine with a microprocessor, which is connected to means for entering commands with a display screen and with at least one memory.

BACKGROUND OF THE INVENTION

In prior-art sewing or embroidery machines of this type, it is frequently necessary to look up the description of the operator's manual supplied with the machine for the explanation of certain operating procedures, such as the insertion of the sewing threads, the setting of the thread tension, the configuration of the sewing or embroidery machine, etc. It has also been known that a brief description of the measures necessary for carrying out the operation can be called up on the display screen of the sewing or embroidery machine by actuating the keyboard.

However, it was found that the manual originally supplied with the particular sewing or embroidery machine frequently can no longer be located or is not complete after a certain time The calling up of a corresponding text to be read by the operator on the display screen of the sewing or embroidery machine is also problematic, depending on the prior training of the operator, because the text is frequently not understood by the operator or it is not understood correctly.

SUMMARY AND OBJECTS OF THE INVENTION

The basic object of the present invention is to provide a sewing or embroidery machine of the type mentioned in the introduction which has features with which certain operating procedures of the machine can be explained rapidly and understandably when needed.

According to the invention, a sewing or embroidery machine is provided with a microprocessor, which is connected to said commands entering device, which is connected to a display screen and which is connected to at least one memory. Image data explaining the operation of the sewing or embroidery machine is stored in the memory. The microprocessor upon receiving a corresponding command, reads the image data characteristic for the explanation of the selected operation of the sewing or embroidery machine from the memory and transfers the data to the display screen such that the particular operating procedure is displayed in the form of animated images (a series of images) on the display screen. The transfer may occur after further processing.

The present invention is based essentially on the idea of representing the corresponding operation by a series of images to explain the operating procedures. For example, when the auxiliary function "Info: Thread sewing thread" is activated, a movie (e.g., a display based on picture signals—video) is shown on the display screen of the sewing or embroidery machine, which shows the insertion of a sewing thread. Image data explaining the operation of the sewing or embroidery machine, which are read from the microcomputer after entering a corresponding command and are optionally transferred onto the display screen, optionally after further processing, are stored for this in the memory of the sewing or embroidery machine.

To make possible the modular design of the sewing or embroidery machine and also to be able to use commercially available microprocessors with a preset processing speed, it has also proved to be advantageous to connect the microprocessor via an application-specific circuit assuming the control of the display screen with an image memory such that the image memory is loaded by the microprocessor with image data via the circuit and that the application-specific circuit will then cyclically read the image data being stored from the image memory to generate the image signals and subjects these correspondingly to further processing.

It has, furthermore, proved to be advantageous to provide additional areas, whose key functions, such as forward and backward as well as start and stop, are associated with the series of images, on the display screen for setting the image sequence of the series of images explaining the operating procedure.

The memory may be a program memory containing the operating software of the sewing or embroidery machine. The memory may also be in the form of a card memory, which is located in a corresponding memory device with a card slot. Such a memory device may be connected to the microprocessor.

The microprocessor may be such that the operating procedure to be explained is displayed in the form of a movie. To set the image sequence of the series of images (the movie) explaining the operating procedure, additional keyboard function areas may be displayed on the display screen (soft keys). The additional keyboard function areas may have key functions assigned to them, such as forward and backward scrolling of the series of images to be displayed or the starting and stopping of the series of images.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
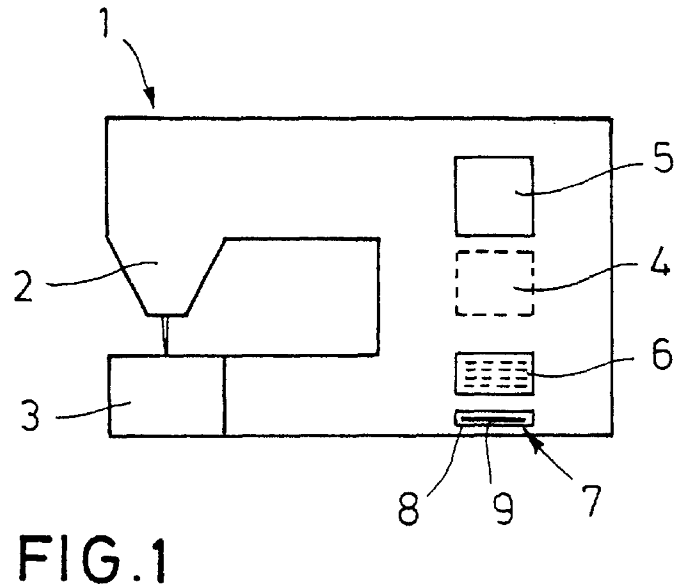
FIG. 1 is a schematic view of a sewing machine according to the present invention with an integrated microcomputer and a display screen.

Referring to the drawings in particular, a program-controlled sewing machine, which comprises a stitch-forming device part 2 and a feed unit 3, is designated by 1 in FIG. 1. In addition, the sewing machine 1 has a microcomputer 4, which is indicated by broken lines and is connected to a display screen 5 and to a keyboard 6 as well as to a memory device 7 with card slot 8 for replaceable memory cards 9.

Figure 2:
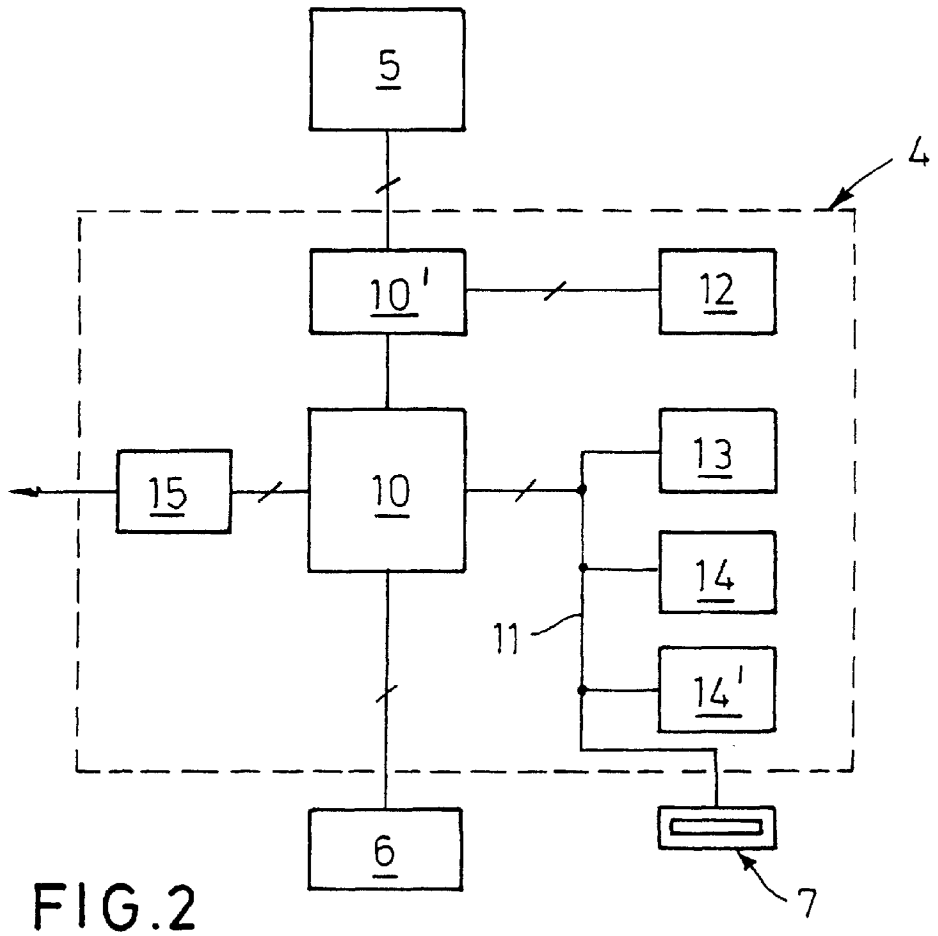
FIG. 2 is a block diagram of the microcomputer of the sewing machine shown in FIG. 1.

The microcomputer 4 comprises a microprocessor 10, which is connected via a bus system 11 to both a program memory 13, a data memory 14 and optionally additional storage device 14' as well as to the memory device 7 (FIG. 2). In addition, the microprocessor 10 is connected via corresponding lines to the keyboard 6 and via an application-specific integrated circuit (ASIC) 10' to the display screen 5 as well as to a unit 15 for driving the electrical and electronic components of the sewing machine (drive motor, sensors for determining the thread tension, etc.), which are not shown for clarity's sake.

The ASIC 10' is connected to an image memory 12 and is responsible for the entire driving of the display screen 5, because the microprocessor cannot assume this task in the exemplary embodiment being described here for reasons of capacity and speed. Since the ASIC 10' cannot have access to the same memory as the microprocessor 10, it requires a memory 12 of its own.

If, e.g., an operating aid for threading the sewing thread is described for sewing a zigzag pattern, this is provided as a series of animated images. The images demonstrate the course of the thread for the sewing thread insertion operation. The images are shown, e.g., under the keyword "Info: Thread Sewing Thread" in the corresponding sewing menu. This menu is called up by means of the keyboard 6 and is shown on the display screen 5. To do so, the microprocessor 10 reads the image data (e.g., in bit map form) sequentially in a certain time grid, e.g., from the program memory 13 and transfers the data via the ASIC 10' to the image memory 12. The image data are subsequently read by the ASIC 10' cyclically from the image memory 12, converted into corresponding image signals and these are displayed on the display screen 5.

For setting the image sequence on the display screen, it proved to be advantageous to display additional areas (softkeys) on the display screen, to which key functions such as forward and backward, start and stop, of the series of images are assigned.

Figure 3:
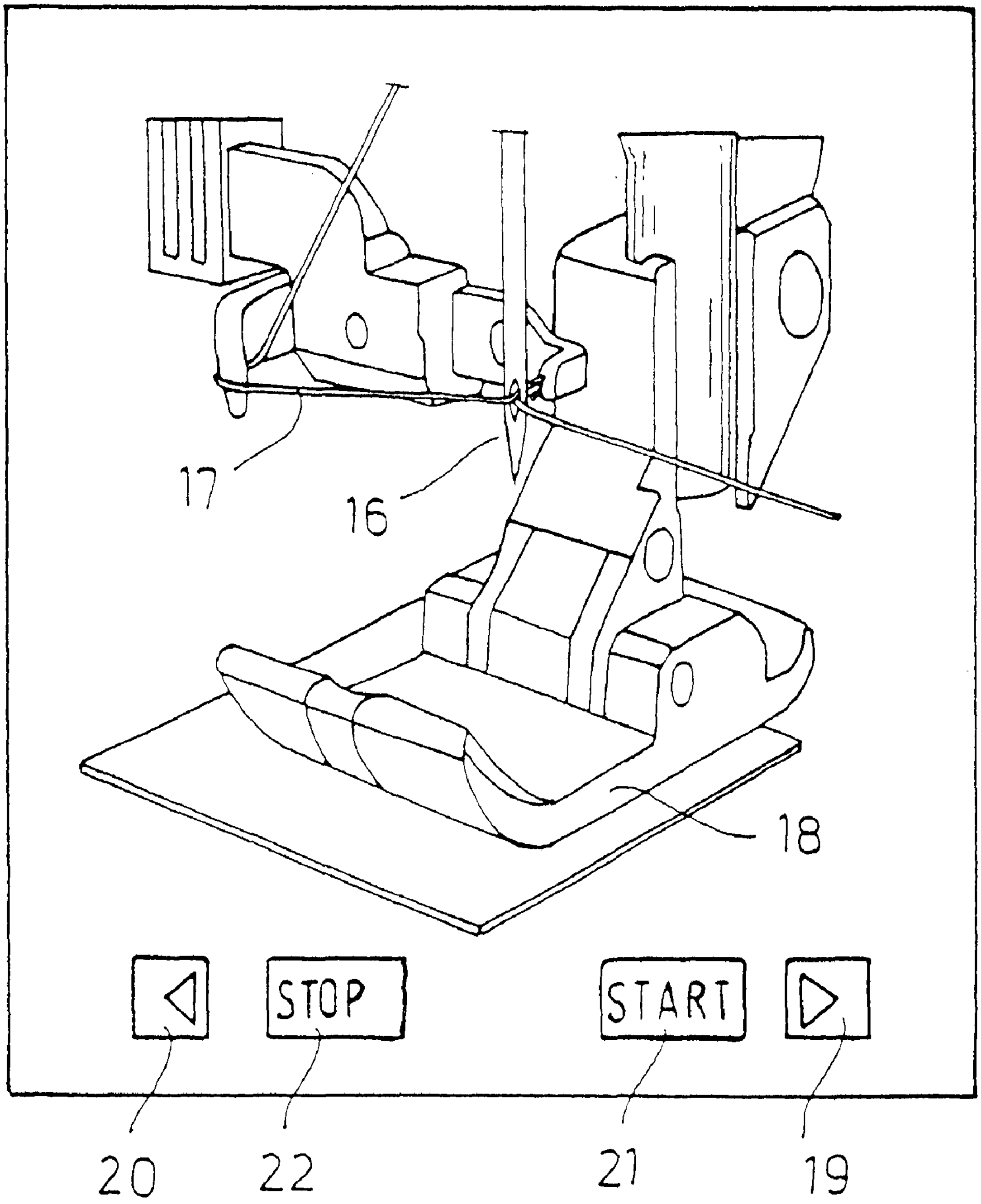
FIG. 3 is a top view of the display screen of the sewing machine shown in FIG. 1.

The view of a corresponding image on the display screen is shown in FIG. 3, the series of images for representing the insertion of a sewing thread having been interrupted by pressing the key function area "Stop." The sewing needle 16, the sewing thread 17 and the sewing foot 18 are clearly visible. The keyboard function areas for image forward and image backward as well as starting and stopping the image forward and image backward are designated by the reference numbers 19–22.

The present invention is, of course, not limited to the above-described exemplary embodiment. The memory may also be in the form of a card memory, which is located in a corresponding memory device 7 with a card slot. Such a memory device may be connected to the microprocessor as shown in FIG. 2. Or a separate device may be connected to the sewing machine 1 The image data may also be stored on this card memory 9 instead of in the program memory 13.

Furthermore, the operating procedure to be displayed may be shown both as a relatively rapid movie and in the form of a series of images. In this case a showing of a series of images, a new start signal must be entered for changing the image after each displayed image. This new start signal may depend on whether the operator has in fact also performed the correspondingly displayed operation on the sewing or embroidery machine.

While specific embodiments of the invention have been shown and described in detail to illustrate the application of the principles of the invention, it will be understood that the invention may be embodied otherwise without departing from such principles.

What is claimed is:

1. A sewing or embroidery machine, comprising:

a microprocessor;

an entry device for entering commands;

a display screen;

a memory device;

image data for explaining the operation of the sewing or embroidery machine stored in the memory device, said microprocessor, after receiving a corresponding command, reading the image data characteristic for the explanation of the selected operation of the sewing or embroidery machine from the memory for the corresponding command and transferring said image data, said microprocessor processing said image data prior to transferring image data;

image memory; and an application-specific circuit, said microprocessor being connected to said image memory via said application-specific circuit, said microprocessor transferring said image data and loading said image data in said image memory via said application-specific circuit, said application-specific circuit cyclically reading the image data stored in the image memory and making image data available for the display screen such that the particular operating procedure is displayed in the form of animated images or sequential images on the display screen based on the cyclical reading of the image data stored in the image memory.

2. A sewing or embroidery machine in accordance with claim 1, wherein said memory is a program memory containing the operating software of the sewing or embroidery machine.

3. A sewing or embroidery machine in accordance with claim 1, wherein said memory device is a card memory located in a corresponding memory card device with a card slot, said memory card device being connected to said microprocessor.

4. A sewing or embroidery machine in accordance with claim 1, wherein said microprocessor provides data to said display for presenting the operating procedure to be explained as a movie.

5. A sewing or embroidery machine, comprising: a microprocessor; an entry device for entering commands; a display screen; a memory device; and image data for explaining the operation of the sewing or embroidery machine stored in the memory device, said microprocessor, after receiving a corresponding command, reading the image data characteristic for the explanation of the selected operation of the sewing or embroidery machine from the memory for the corresponding command and transferring the data to the display screen such that the particular operating procedure is displayed in the form of animated images on the display screen, wherein to set the image sequence of the series of images explaining the operating procedure, additional keyboard function areas, to which key functions, such as forward and backward scrolling of the series of images to be displayed or the starting and stopping of the series of images are assigned, are displayed on the display screen.

6. A sewing or embroidery machine, comprising:

a data processor system;

an entry device for entering commands, said entry device being connected to said data processor system;

a display screen;

data memory with image data including image sequence data of a series of images for explaining the operation of the sewing or embroidery machine, said data processor system receiving commands from said entry device and reading said image data from the memory corresponding to the command and transferring data to the display screen to selectively display the image data including one of displaying image data sequentially as animated images on the display screen and displaying image data sequentially as discrete images shown in series, said microprocessor processing said data prior to transferring data to said display, wherein said memory includes process memory and image memory and said processor system includes a microprocessor and an application-specific circuit, said microprocessor being connected to said image memory via said application-specific circuit, said application-specific circuit assuming the control of the display screen with image memory loaded by said microprocessor with image data via said application-specific circuit and said application-specific circuit cyclically reading said image data from said image memory and providing the read image data to the display screen.

7. A sewing or embroidery machine in accordance with claim 6, wherein said microprocessor processes said data prior to transferring data to said display.

8. A sewing or embroidery machine in accordance with claim 6, wherein said memory includes process memory and image memory and said processor system includes a microprocessor and an application-specific circuit, said microprocessor being connected to said image memory via said application-specific circuit, said application-specific circuit assuming the control of the display screen with image memory loaded by said microprocessor with image data via said application-specific circuit and said application-specific circuit cyclically reading said image data from said image memory and providing the read image data to the display screen.

9. A sewing or embroidery machine in accordance with claim 6, wherein said memory is a program memory containing the operating software of the sewing or embroidery machine.

10. A sewing or embroidery machine in accordance with claim 6, wherein said memory device is a card memory located in a corresponding memory card device with a card slot, said memory card device being connected to said processor system.

11. A sewing or embroidery machine in accordance with claim 6, wherein said microprocessor provides data to said display for presenting the operating procedure to be explained as a movie.

12. A sewing or embroidery machine in accordance with claim 6, further comprising soft keys established with said processor and said display for controlling the image sequence of the series of images explaining the operating procedure.

13. A sewing or embroidery machine, comprising:

a data processor system;

an entry device for entering commands, said entry device being connected to said data processor;

a display screen;

data memory with image data including image sequence data of a series of images for explaining the operation of the sewing or embroidery machine, said data processor system receiving commands from said entry device and reading said image data from the memory corresponding to the command and transferring data to the display screen to selectively display the image data including one of displaying image data sequentially as animated images on the display screen and displaying image data sequentially as discrete images shown in series; and soft keys established with said processor and said display for controlling the image sequence of the series of images explaining the operating procedure.

* * * * *